(12) United States Patent
Kojima et al.

(10) Patent No.: US 6,384,506 B1
(45) Date of Patent: May 7, 2002

(54) BOBBIN UNIT FOR BRUSHLESS ALTERNATOR FIELD COIL AND ASSEMBLING METHOD THEREOF

(75) Inventors: Kenta Kojima; Yukio Sakane, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 307 days.

(21) Appl. No.: 08/960,255

(22) Filed: Oct. 29, 1997

(30) Foreign Application Priority Data

Jul. 30, 1997 (JP) .............................................. 9-204722

(51) Int. Cl.[7] .............................................. H02K 19/22
(52) U.S. Cl. ...................................... 310/194; 310/263
(58) Field of Search ................................ 310/194, 263

(56) References Cited

U.S. PATENT DOCUMENTS

| | | | | |
|---|---|---|---|---|
| 3,603,825 A | * | 9/1971 | Sheridan et al. ............ | 310/194 |
| 3,671,906 A | * | 6/1972 | Hodges et al. .............. | 310/263 |
| 5,097,169 A | * | 3/1992 | Fukushima ................. | 310/263 |
| 5,130,590 A | * | 7/1992 | Sugiura ....................... | 310/263 |
| 5,437,090 A | * | 8/1995 | Sakane et al. .............. | 310/263 |

FOREIGN PATENT DOCUMENTS

JP          1-34535          10/1989

* cited by examiner

*Primary Examiner*—Karl Tamai
(74) *Attorney, Agent, or Firm*—Sughrue Mion, PLLC (57) ABSTRACT

A bobbin unit for a brushless alternator field coil, which can reduce the diameter of a bobbin, need not wind a tape and can be made easily, has a ring-shaped iron core having a thick wall; a plate having a hole whose inside diameter is as large as that of the iron core and which is composed of a thin wall cylindrical portion having an end which is abutted against and connected by an abutting/connecting operation to an end surface of the iron core with the axial center of the cylindrical portion being in coincidence with that of the iron core, and a flange portion formed at the opposite side of the cylindrical portion and extending outwardly in a radial direction; and a resinous bobbin interposed between the iron core and the plate for insulating and accommodating a field coil.

9 Claims, 11 Drawing Sheets

BOBBIN UNIT FOR BRUSHLESS ALTERNATOR FIELD COIL AND ASSEMBLING METHOD THEREOF

BACKGROUND OF THE INVENTION

1. Field of the Invention

The present invention relates to a bobbin unit for holding the field coil of a brushless alternator.

2. Description of the Related Art

Figure 13:
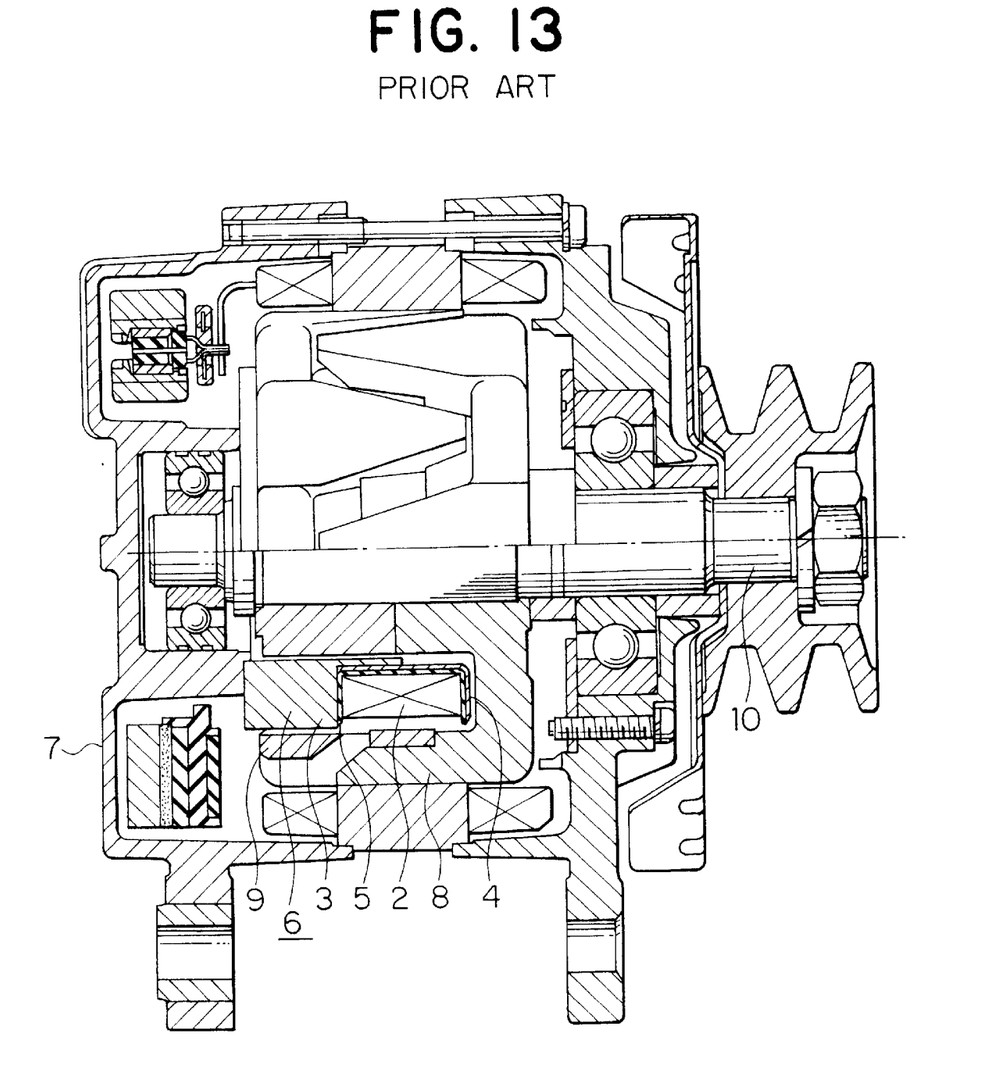
FIG. 13 is a sectional view showing a conventional brushless alternator for vehicle taken along the axial direction thereof.
Figure 14:
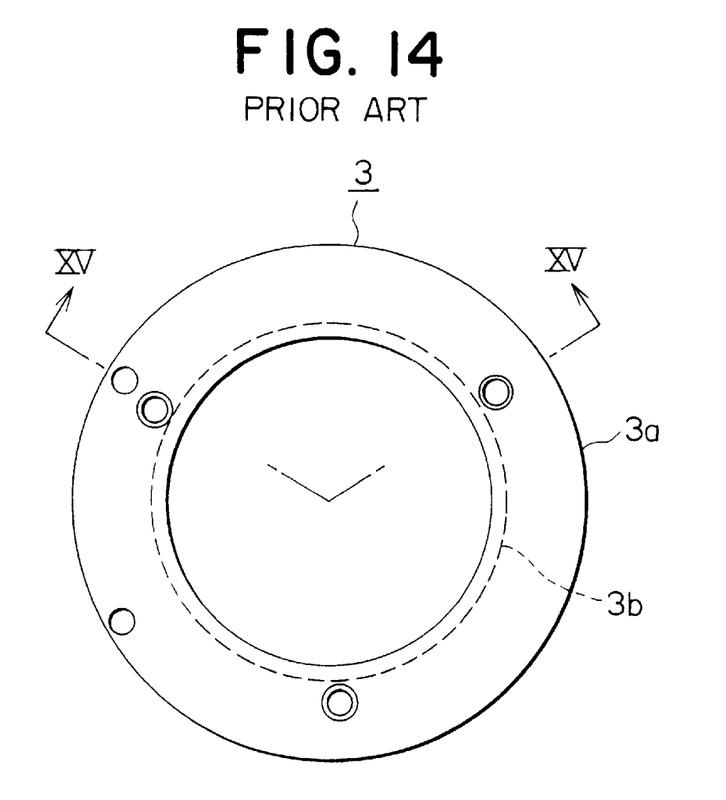
FIG. 14 is an upper plan view of the iron core of a conventional bobbin unit.
Figure 15:
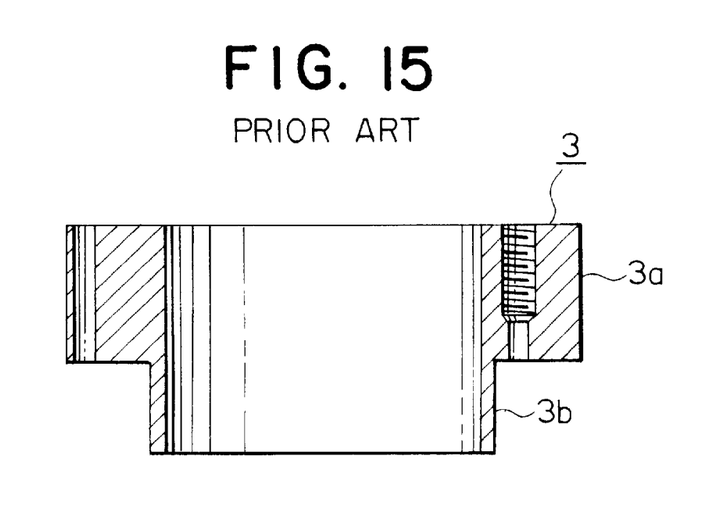
FIG. 15 is a sectional view taken along the line XV—XV of FIG. 14.
Figure 16:
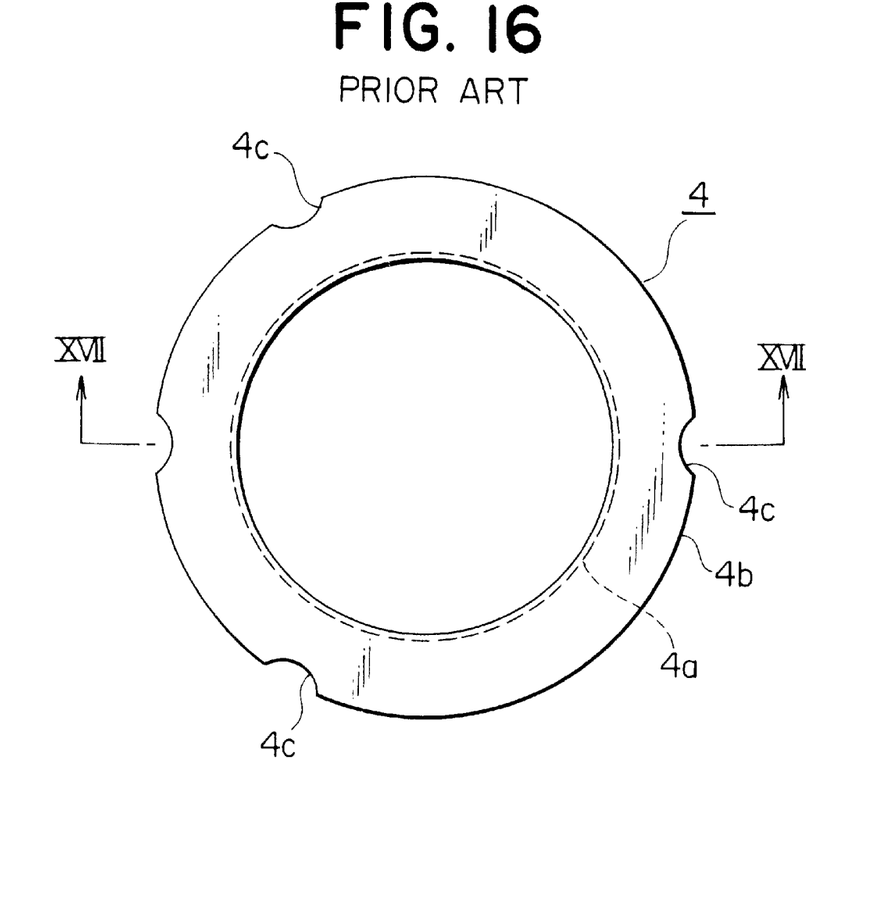
FIG. 16 is an upper plan view of the plate of the conventional bobbin unit.
Figure 17:
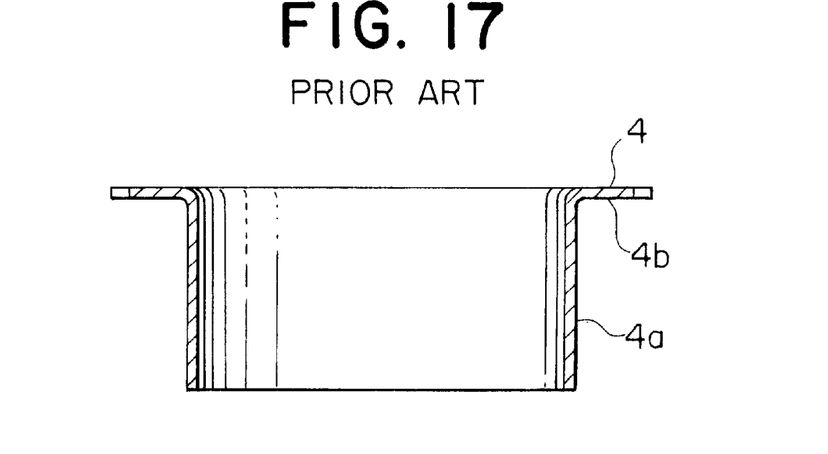
FIG. 17 is a sectional view taken along the line XVII—XVII of FIG. 16.
Figure 18:
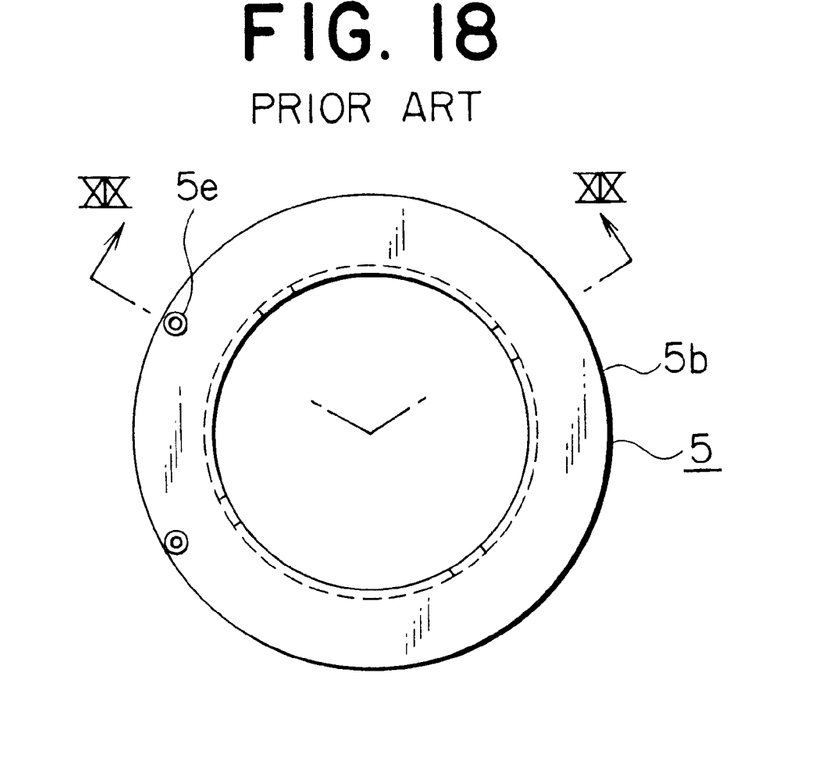
FIG. 18 is an upper plan view of the bobbin of the conventional bobbin unit.
Figure 19:
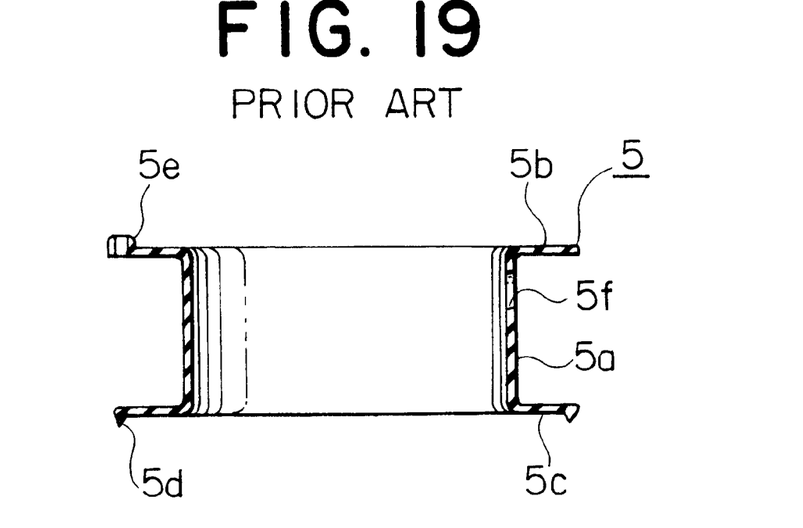
FIG. 19 is a sectional view taken along the line XIX—XIX of FIG. 18.
Figure 20:
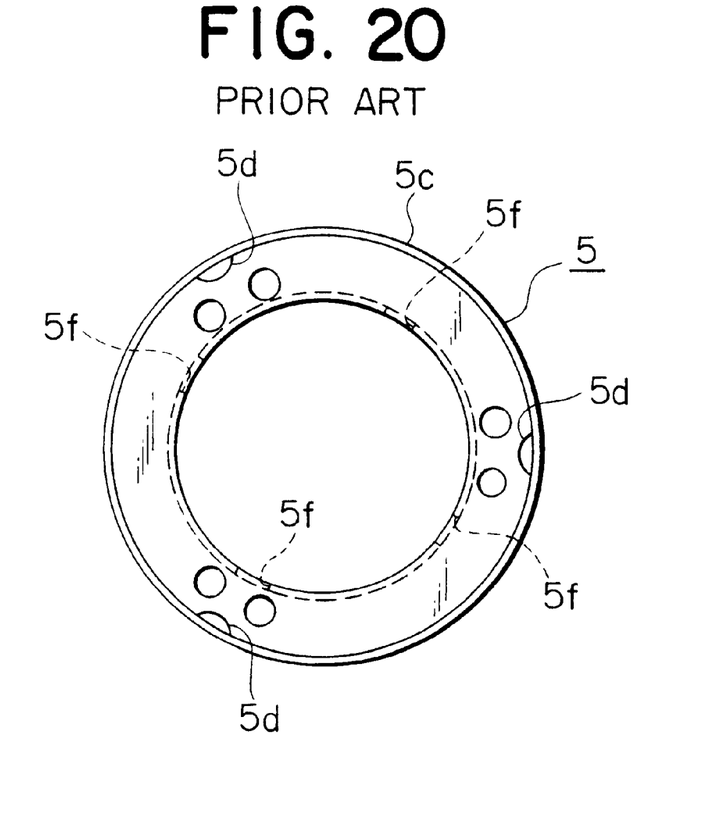
FIG. 20 is a backside plan view of the bobbin.
Figure 21:
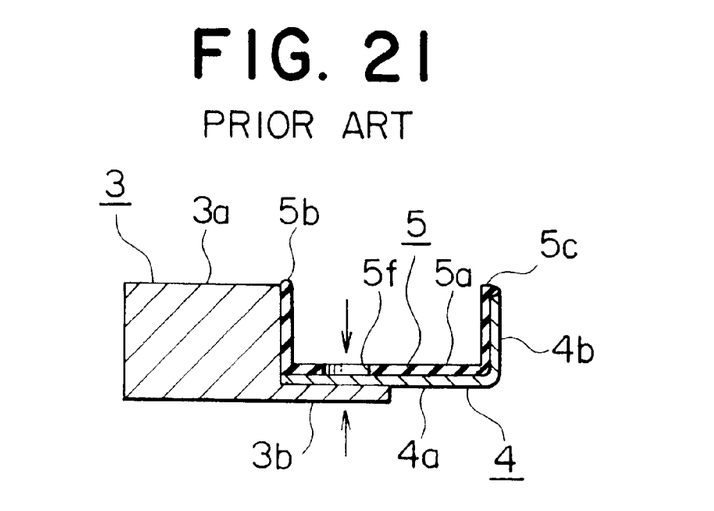
FIG. 21 is a sectional view of the main portion of the bobbin unit showing how an iron core is connected to a plate by spot welding.

FIG. 13 is a sectional view showing a conventional brushless alternator for a vehicle taken along the axial direction thereof, FIG. 14 is an upper plan view of the iron core of a conventional bobbin unit, FIG. 15 is a sectional view taken along the line XV—XV of FIG. 14, FIG. 16 is an upper plan view of the plate of the conventional bobbin unit, FIG. 17 is a sectional view taken along the line XVII—XVII of FIG. 16, FIG. 18 is an upper plan view of the bobbin of the conventional bobbin unit, FIG. 19 is a sectional view taken along the line XIX—XIX of FIG. 18, FIG. 20 is a backside plan view of the bobbin and FIG. 21 is a sectional view of the main portion of the bobbin unit showing how an iron core is connected to a plate by spot welding.

In FIG. 13, a brushless alternator 1 is arranged such that a field coil 2 does not rotate and a bobbin unit 6 which holds the field coil 2 is fixed to the rear bracket 7 of the alternator, and is different from an alternator with a rotary field type brush. An N-pole rotor core 8 and an S-pole rotor core 9 are rotated together with a shaft 10.

The bobbin unit 6 is composed of an approximately cylindrical iron core 3 as a field iron core forming a magnetic circuit, a thin wall plate 4 connected to the iron core 3 by spot welding and a resinous bobbin 5 interposed between the iron core 3 and the plate 4 for accommodating the field coil 2.

As shown in FIG. 14 and FIG. 15, the iron core 3 is formed of a cylindrical thick wall portion 3a having a thick wall and a thin wall portion 3b projecting from the minimum radius portion of the thick wall portion 3a along the periphery thereof. The iron core 3 is made by being machined from a round steel bar by turning. On the other hand, the plate 4 is stamped from a mild steel sheet and composed of a cylindrical portion 4a formed to a cylindrical shape and a flange portion 4b formed from one end of the cylindrical portion 4a so as to spread outwardly of the radial direction thereof is shown in FIG. 16 and FIG. 17. Cutouts 4c, which position a bobbin 5 to be described later and with which the projections of detents are engaged, are formed to the outer periphery of the flange portion 4b.

As shown in FIG. 18 to FIG. 20, the bobbin 5 is formed of an approximately-thread-spool-shaped cylindrical portion 5a formed to a cylindrical shape and flange portions 5b, 5c formed at both the ends of the cylindrical portion 5a. Projections 5d which are engaged, as detents, with the cutouts 4c of the plate 4 are formed to the outer periphery of the flange portion 5c on one side. On the other hand, a projection 5e having a through hole at the center thereof is formed to the outer periphery of the flange portion 5b on the opposite side and serves as a detent also acting as a port through which an electric cable is drawn out. Further, four through holes 5f are defined along the circumference of the cylindrical portion 5a at the intervals of 90°. The through holes 5f are defined to permit electric poles to pass therethrough when the iron core 3 is connected to the plate 4 by spot welding.

The conventional bobbin unit 6 arranged as described above is assembled in such a manner that, first, the cylindrical portion 4a of the plate 4 is inserted into the bobbin 5 and positioned thereto by the engagement of the projections 5d with the cutouts 4c. Next, the end of the cylindrical portion 4a opposite to the flange portion 4b is mounted to the thin wall portion 3b of the iron core 3 and the thin wall portion 3b and the cylindrical portion 4a are clamped by a pair of electrodes disposed on the bobbin 5 side and the inner peripheral side of the thin wall portion 3b and spot welded, so that the iron core 3 is connected to the plate 4. Thereafter, a not shown tape is wound around the cylindrical portion 5a of the bobbin 5 for clogging the through holes 5f in order to prevent the short circuit of the field coil 2.

In the conventional bobbin unit 6 arranged as described above, the field coil 2 is wound around the bobbin 5 of the bobbin unit 6 and fixed to the rear bracket 7 of the brushless alternator 1.

In general, since the smaller winding diameter of the field coil 2 can shorten the length of a copper wire even if the wire has the same number of turns, a cost can be reduced. Therefore, it is effective that the cylindrical portion 5a of the bobbin 5 has a diameter as small as possible. In the conventional bobbin unit 6, however, since the thin wall portion 3b is required to the iron core 3 to execute the spot welding, the diameter of the cylindrical portion 5a of the bobbin 5 is increased by the thickness of the thin wall portion 3b. In addition, the thin wall portion 3b needs a predetermined length in an axial direction and must be formed to an accurate cylindrical surface. Further, since the thin wall portion 3b has a thin wall thickness, the iron core 3 is machined by turning from a round steel bar and the thin wall portion 3b is formed by removing an unnecessary portion from the round steel bar. As a result, a large amount of the steel bar is removed by the turning, by which the material and time are wasted. Further, workability is not good because the field coil 2 is wound after the iron core 3 is connected to the plate 4.

In addition, the through holes 5f must be defined to the bobbin 5 for spot welding and further the tape must be wound to clog the through holes 5f.

An object of the present invention made to solve the above problem is to provide a bobbin unit for a brushless alternator field coil which can reduce the diameter of a bobbin, need not wind a tape and can be made easily and a method of assembling the bobbin unit.

SUMMARY OF THE INVENTION

A bobbin unit for a brushless alternator field coil according to one embodiment comprises a ring-shaped iron core having a thick wall; a plate which has a cylindrical portion and a flange portion, the cylindrical portion is formed to a thin cylindrical shape having a hole whose inside diameter is as large as the center hole of the iron core and the end of one side of the cylindrical portion is abutted against and connected by butt connection means to the end surface of the iron core on one side thereof with the axial center of the cylindrical portion being in coincidence with that of the iron core, and the flange portion extends outwardly in a radial direction from the end of the cylindrical portion on the other side thereof; and a resinous bobbin disposed in the space formed by the end surface of the iron core on the one side thereof and the outer peripheral surface of the plate for insulating and accommodating a field coil.

A bobbin unit for a brushless alternator field coil according to another embodiment is arranged such that the iron core includes a concentric circular engaging portion formed to the end surface on the side thereof, and the cylindrical portion is connected and the cylindrical portion is connected to the iron core by butt connection means with the end on the one side thereof being engaged with the engaging portion.

A bobbin unit for a brushless alternator field coil according to yet another embodiment is arranged such that the butt connection means is butt welding.

A bobbin unit for a brushless alternator field coil according to still another embodiment is arranged such that the butt connection means is projection welding.

A bobbin unit for a brushless alternator field coil according to still another embodiment is arranged such that the butt connection means is beam welding.

A bobbin unit for a brushless alternator field coil according to still another embodiment is arranged such that the butt connection means is an adhesive.

A method of assembling a bobbin unit for a brushless alternator field coil according to another embodiment comprises the steps of mounting a thread-spool-shaped bobbin to a plate composed of a cylindrical portion having a thin wall and a flange portion extending outwardly in a radial direction from the end of the cylindrical portion one side thereof from the direction opposite to the flange portion, the bobbin being as long as the cylindrical portion; and abutting the end of the plate opposite to the flange portion against the end surface of a thick ring-shaped iron core and connecting the plate to the iron core by butt connection means.

A method of assembling a bobbin unit for a brushless alternator field coil according to yet another embodiment is arranged such that the butt connection means is butt welding.

A method of assembling a bobbin unit for a brushless alternator field coil according to still another embodiment is arranged such that the butt connection means is an adhesive.

DESCRIPTION OF THE PREFERRED EMBODIMENT

Embodiment 1

Figure 1:
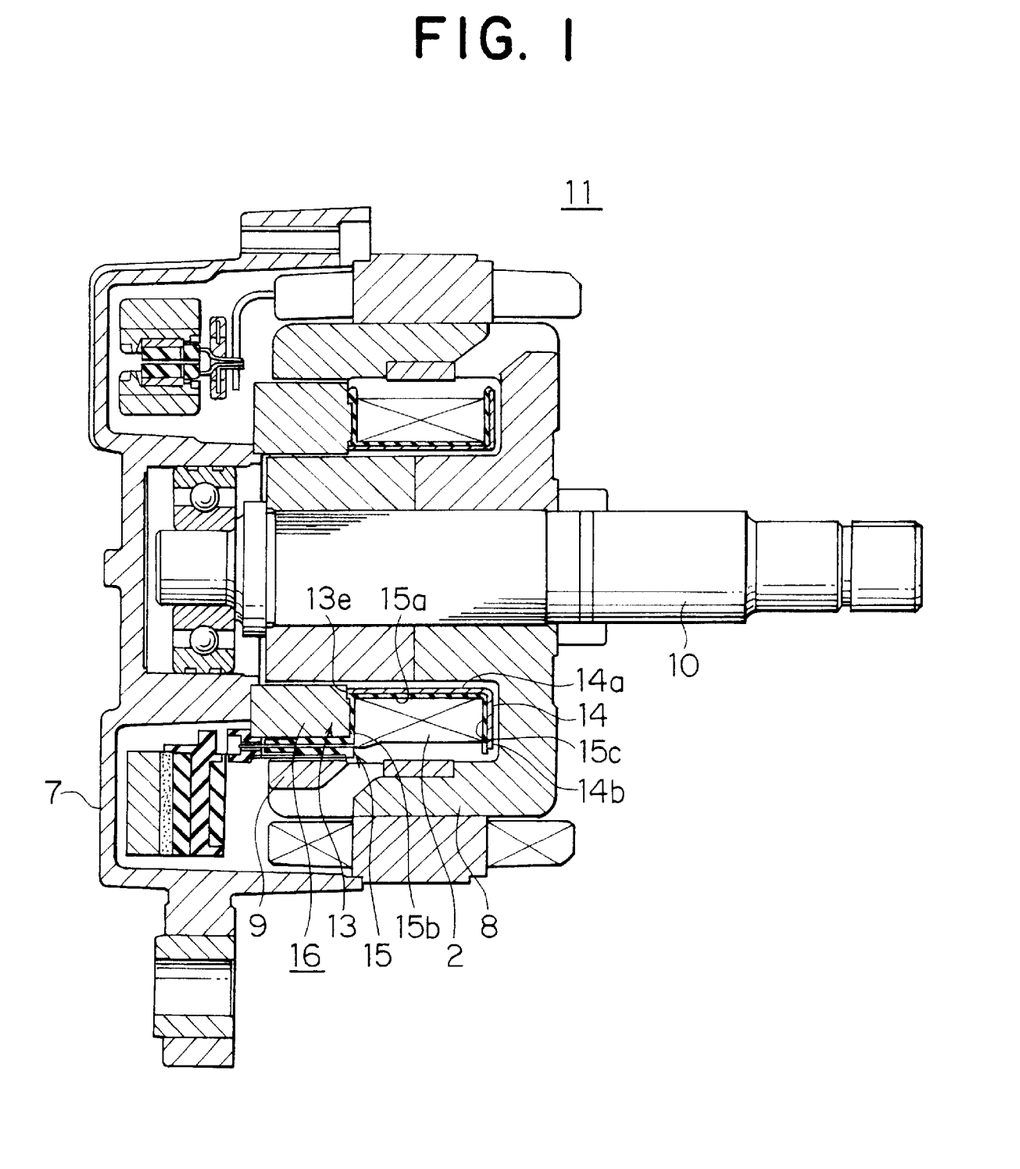
FIG. 1 is a sectional view of the main portion of a brushless alternator for vehicle according to the present invention.
Figure 2:
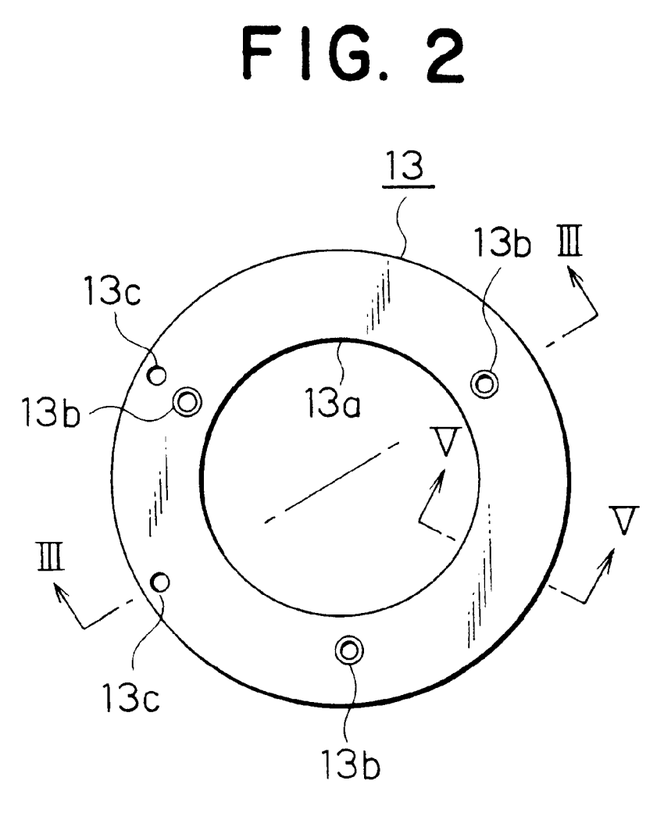
FIG. 2 is an upper plan view of the iron core of a bobbin unit of the present invention.
Figure 3:
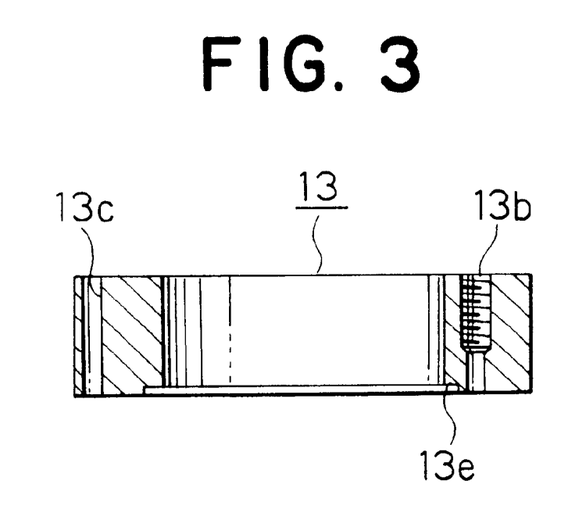
FIG. 3 is a sectional view taken along the line III—III of FIG. 2.
Figure 4:
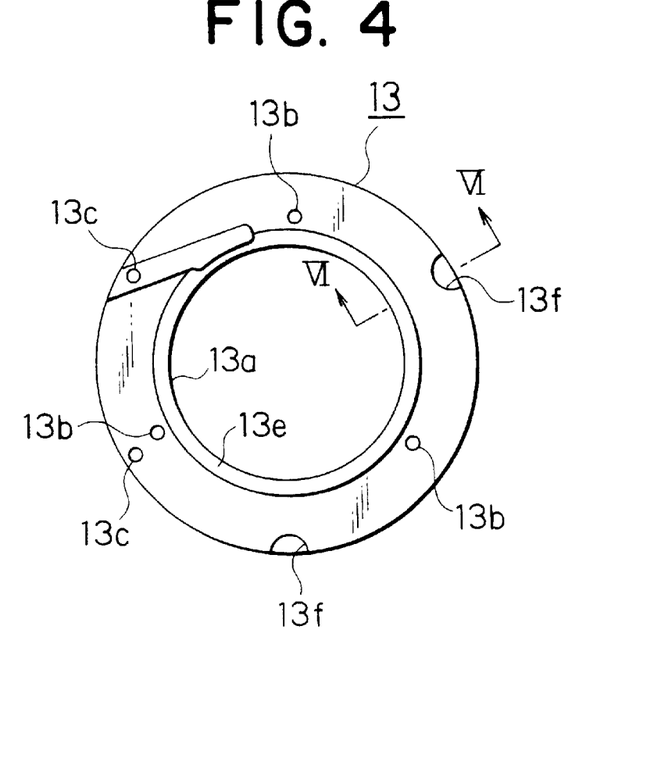
FIG. 4 is a backside plan view of the iron core of the bobbin unit of the present invention.
Figure 5:
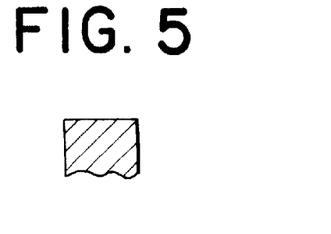
FIG. 5 is a sectional view taken along the line V—V of FIG. 2.
Figure 6:
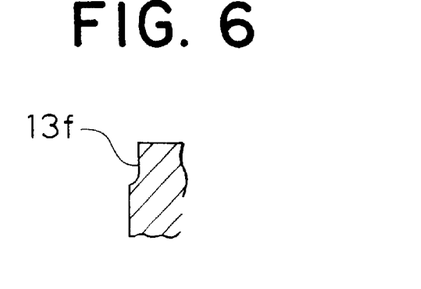
FIG. 6 is a sectional view taken along the line VI—VI of FIG. 4.
Figure 7:
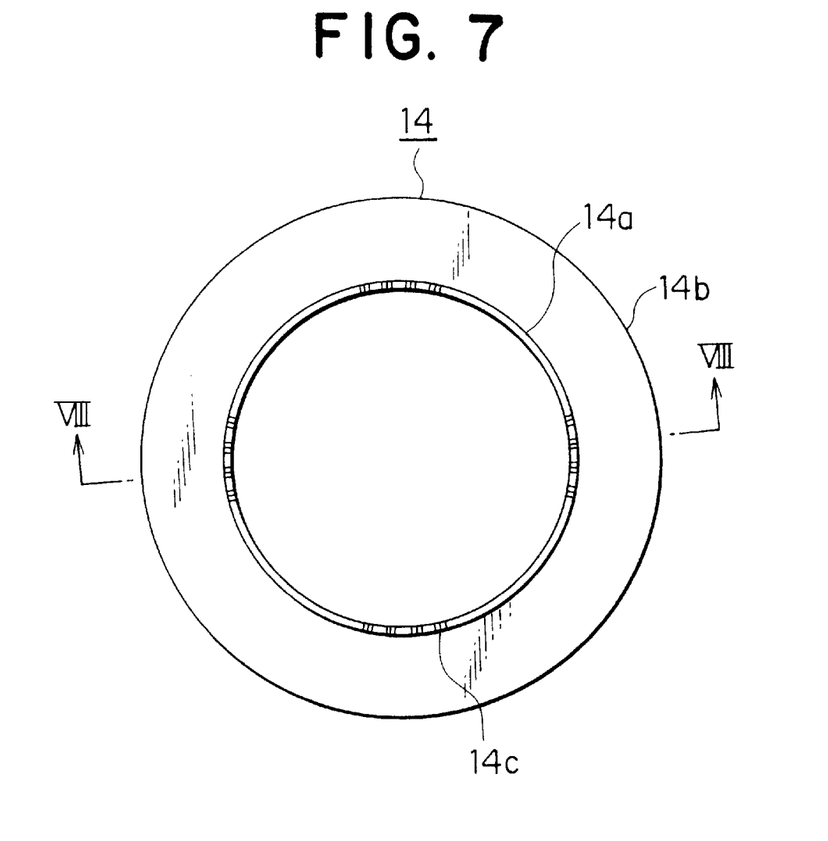
FIG. 7 is an upper plan view of the plate of the present invention.
Figure 8:
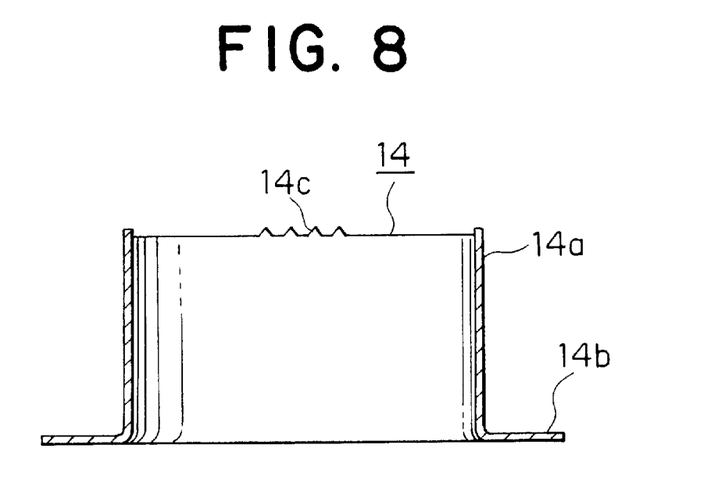
FIG. 8 is a sectional view taken along the line VIII—VIII of FIG. 7.
Figure 9:
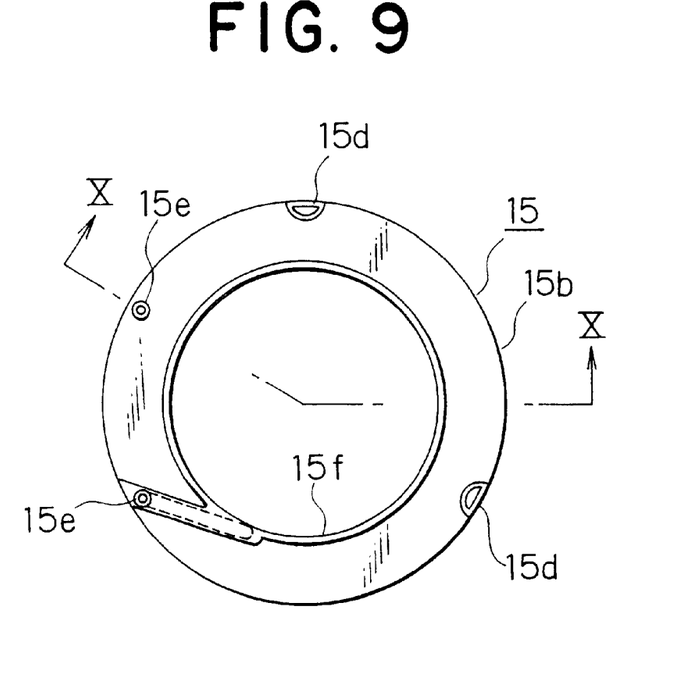
FIG. 9 is an upper plan view of the bobbin of the bobbin unit of the present invention.
Figure 10:
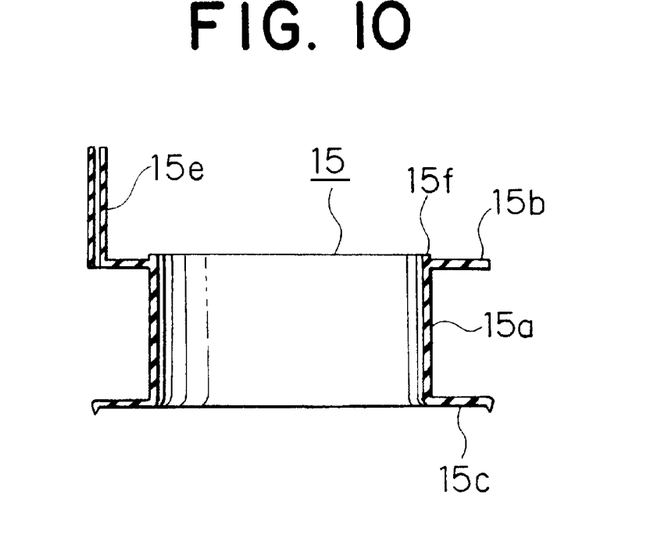
FIG. 10 is a sectional view taken along the line X—X of FIG. 9.
Figure 11:
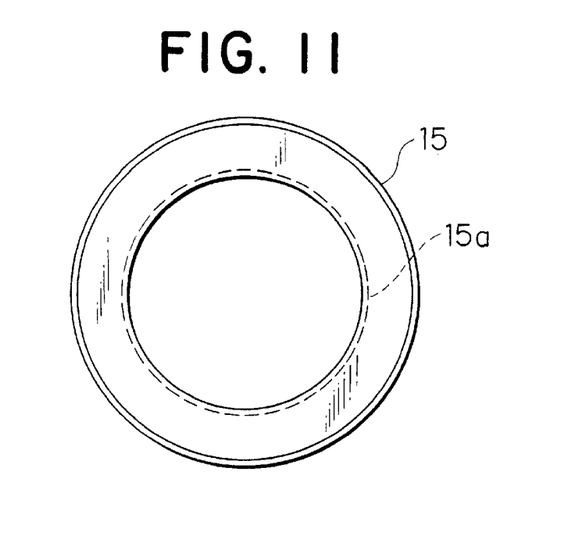
FIG. 11 is a backside plan view of the bobbin of the bobbin unit of the present invention.
Figure 12:
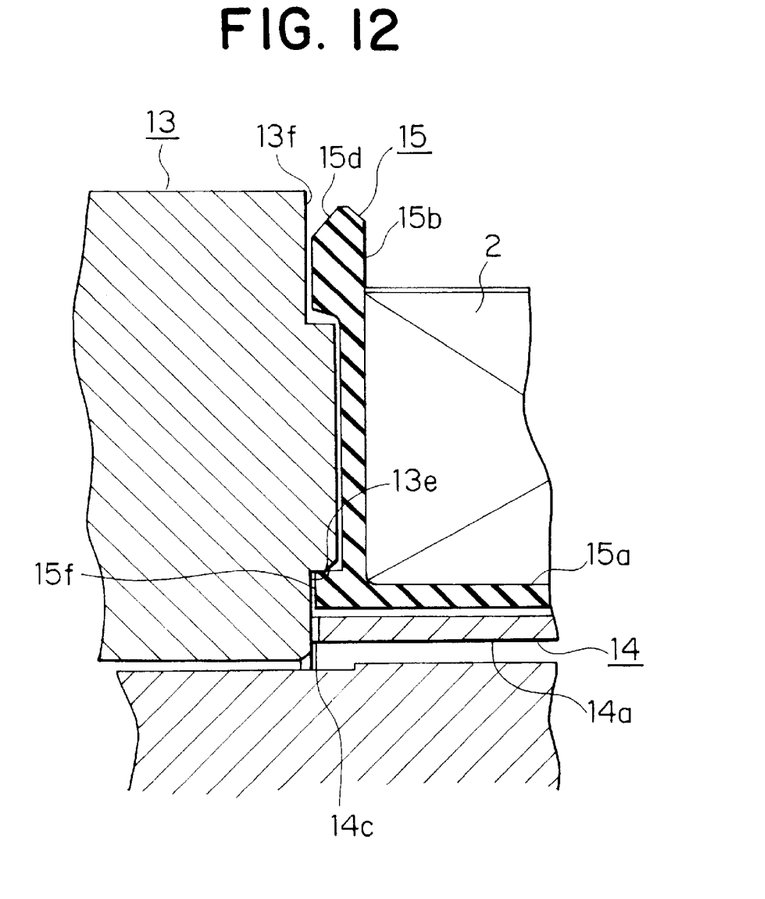
FIG. 12 is a sectional view of the main portion of the bobbin unit of the present invention.

FIG. 1 is a sectional view of the main portion of a brushless alternator for vehicle according to the present invention, FIG. 2 is an upper plan view of the iron core of a bobbin unit of the present invention, FIG. 3 is a sectional view taken along the line III—III of FIG. 2, FIG. 4 is a backside plan view of the iron core, FIG. 5 is a sectional view taken along the line V—V of FIG. 2, FIG. 6 is a sectional view taken along the line VI—VI of FIG. 4, FIG. 7 is an upper plan view of the plate of the present invention, FIG. 8 is a sectional view taken along the line VIII—VIII of FIG. 7, FIG. 9 is an upper plan view of the bobbin of the bobbin unit of the present invention, FIG. 10 is a sectional view taken along the line X—X of FIG. 9, FIG. 11 is a backside plan view of the bobbin and FIG. 12 is a sectional view of the main portion of the bobbin unit of the present invention.

In FIG. 1, a brushless alternator 11 of the embodiment is arranged such that a field coil 2 is supported by a bobbin unit 16 and fixed to the rear bracket 7 of the alternator. Further, an N-pole rotor core 8 and an S-pole rotor core 9 are rotated together with a shaft 10 likewise the conventional ones. The bobbin unit 16 is composed of a ring-shaped iron core 13 having a thick wall as a field iron core forming a magnetic circuit, a plate 14 having a thin wall and connected to the iron core 13 by projection welding as projecting connection means and a resinous bobbin 15 interposed between the iron core 13 and the plate 14 for accommodating the field coil 2.

In FIG. 2 to FIG. 6, the iron core 13 of the embodiment is formed to a thick wall ring shape having a center hole 13a as well as three fixing holes 13b defined in the peripheral direction thereof at equal intervals in parallel with a center axis. Two through holes 13c are defined at the predetermined positions of the periphery of the iron core 13 to permit electric wires to pass therethrough. In addition, a stepped portion 13e acting as an engaging portion is formed to the end surface of the other side of the iron core 13 along the peripheral edge of the center hole 13a and further two cutouts 13f, which are separated from each other by a predetermined angle, are formed to the outer periphery of the above end surface. The iron core 13 is formed from a ring-shaped forged material having a thick wall in such a manner that the stepped portion 13e is machined by turning and the fixing holes 13b and the through holes 13c are drilled at the predetermined positions.

In FIG. 7 and FIG. 8, the plate 14 of the embodiment is stamped from a mild steel sheet and composed of a cylindrical portion 14a having a hole whose inside diameter is as large as the center hole 13a of the iron core 13 and a flange portion 14b formed from an end of the cylindrical portion 14a so as to spread outwardly of the radial direction thereof. Respective four triangle projections 14c, which are separated from each other by 90° in a peripheral direction, are formed to the end of the cylindrical portion 14a opposite to the flange portion 14b at four positions so as to concentrate power when the projection welding is executed.

In FIG. 9 to FIG. 11, the bobbin 15 of the embodiment is made of a resin, formed to an approximately—thread-spool-shape and composed of a cylindrical portion 15a formed to a cylindrical shape and disc-shaped flange portions 15b, 15c formed to both the ends of the cylindrical portion 15a. The inside diameter of the cylindrical portion 15a is approximately as large as the outside diameter of the cylindrical portion 14a of the plate 14 and the length of the cylindrical portion 15a in the axial direction thereof is approximately as long as that of the cylindrical portion 14a in the axial direction thereof. On the other hand, the length of the flange portion 15c in the radial direction thereof is approximately as long as that of the flange portion 14b of the plate 14 in the radial direction thereof. On one side of the bobbin 15, the flange portion 15b has two projections 15d acting as detents which will be engaged with the cutouts 13f of the iron core 13 and projected portions 15e each of which has a through hole acting as an electric wire drawing-out hole and a detent at the center thereof and passes through each of the through holes 13c of the iron core 13. The projections 15d and the projected portions 15e are formed to the outer periphery of the flange portion 15b. On the other hand, the bobbin 15 has an annular projection 15f projecting to a ring-shape along the inner periphery thereof.

The bobbin unit 16 arranged as described above is assembled in such a manner that, first, a field coil 2 is wound around the bobbin 15. Next, the cylindrical portion 14a of the plate 14 is inserted into the bobbin 15. At the time, the plate 14 and the bobbin 15 are not particularly positioned. Thereafter, the end of the plate 14 on the opposite side of the flange portion 14b is abutted against the end surface of the iron core 13 as shown in FIG. 12. At the time, the plate 14 is positioned to the iron core 13 by the engagement of the projections 15d of the bobbin 15 with the cutouts 13f of the iron core 13. Further, the annular projection 15f of the bobbin 15 and the end of the cylindrical portion 14a of the plate 14 are engaged with the stepped portion 13e as the engaging portion of the iron core 13 in an overlapped state. The plate 14 is axially pressed against the iron core 13, by which the extreme ends of the projections 14c of the plate 14 are pressurized. In this state, electrodes are connected to the predetermined positions of the iron core 13 and the plate 14 and projection welding is executed with a high voltage imposed thereon. With this operation, a high current flows to the projections 14c, the projections 14c are melted by the occurrence of resistance heat, so that the end of the plate 14 is welded to the iron core 13.

Note, the annular projection 15f of the bobbin 15 overlapped with the connecting end of the cylindrical portion 14a of the plate 14 is engaged with the stepped portion 13e as the engaging portion of the plate 14 when the projection welding is carried out so as to execute positioning in a radial direction as well as securely insulate the plate 14 from the iron core 13 and assist the power concentration to the projections 14c. Further, the annular projection 15f acts to suppress the movement of the bobbin 15 in the radial direction when the bobbin unit 16 has been assembled.

In the bobbin unit for the brushless alternator field coil arranged as described above, since the iron core 13 does not include a thin wall portion as the conventional iron core does and the end of the plate 14 is abutted against the iron core 13 and projection welded, the outside diameter of the cylindrical portion 14a of the plate 14 can be made smaller than the conventional one. As a result, since the outside diameter of the cylindrical portion 15a of the bobbin 15 disposed to the outer periphery of the plate 14 can be also reduced and the winding diameter of the field coil 2 wound around the bobbin 15 can be reduced, the copper wire of the field coil 2 can be saved.

Further, since the iron core has no thin wall portion different from the conventional one, it can be made by forging except the stepped portion 13e acting as the engaging portion which is machined by turning, a cost can be lowered.

Since the bobbin 15 has not any hole formed thereto to permit spot welding electrodes to pass therethrough, the number of parts is reduced and the number of assembling processes is also reduced.

In the conventional bobbin unit 6, although the field coil 2 is wound around the bobbin 5 after the completion of assembly, the field coil 2 in the bobbin unit 16 of the present invention can be wound around the bobbin 15 before the bobbin unit 16 is assembled. Since the weight of the bobbin 15 as a single body is lighter than that of the bobbin unit 6, a job for winding the field coil 2 around the bobbin 15 can be carried out easier than a conventional job for winding the field coil 2 around the bobbin unit 6.

The bobbin unit 16 of the embodiment has no positioning engagement portion between the plate 14 and the bobbin 15, which makes a job for mounting the bobbin 15 to the plate 14 in the assembly job.

Note, the respective four projections 14c are not always positioned at the intervals of 90° in the number of four pieces but the number of them and the number of the positions where they are located may be increased or decreased as necessary to satisfy a connecting strength.

Further, the butt connection means is not limited to the projection welding but any butt welding capable of welding the end surface of a sheet to an object such as, for example, beam welding and the like may be employed. When the beam welding is employed, the projections 14c need not be formed to the end of the cylindrical portion 14a and welding is carried out by irradiating a beam from the center of the iron core 13 to a portion to be connected. Unless laser welding is used, the projections 14c need not be formed as well as a working time can be shortened. In Tig welding as another welding means, the projections 14c need not be also formed likewise the beam welding. The butt connection means is not limited to the welding described above but, for example, a strong adhesive may be used. When the adhesive is used, the projections 14c also need not be formed to the end of the cylindrical portion 14a and the connection is executed by applying the adhesive to the stepped portion 13e acting as the engaging portion and curing it in the state that the end of the cylindrical portion 14a is abutted against the stepped portion 13e.

A bobbin unit for a brushless alternator field coil according to an embodiment comprises a ring-shaped iron core having a thick wall; a plate which has a cylindrical portion and a flange portion, the cylindrical portion is formed to a thin cylindrical shape having a hole whose inside diameter is as large as the center hole of the iron core and the end of one side of the cylindrical portion is abutted against and connected by butt connection means to the end surface of the iron core on one side thereof with the axial center of the cylindrical portion being in coincidence with that of the iron core, and the flange portion extends outwardly in a radial direction from the end of the cylindrical portion on the other side thereof; and a resinous bobbin disposed in the space formed by the end surface of the iron core on the one side thereof and the outer peripheral surface of the plate for insulating and accommodating a field coil.

As a result, no conventional thin wall portion need not be formed to the iron core, by which the outside diameter of the bobbin can be reduced, so that winding diameter of the filed coil wound around bobbin can be made small and the copper wire used to the field coil can be saved.

Further, since no conventional thin wall portion is formed to the iron core, the iron core can be made by forging except a portion which is made by turning for projection welding, by which a cost can be lowered. Since no hole is defined to the bobbin for permitting the electrodes of spot welding to pass therethrough, no tape need not be wound, the number of parts is reduced and the number of assembling processes is also reduced. In addition, since the field coil can be wound around the bobbin as a single body, a job can be easily carried out.

The bobbin unit for a brushless alternator field coil according to another embodiment is arranged such that the iron core includes a concentric circular engaging portion formed to the end surface on the side thereof, and the cylindrical portion is connected and the cylindrical portion is connected to the iron core by butt connection means with the end on the one side thereof being engaged with the engaging portion. As a result, positioning is securely executed and an assembly job can be easily carried out.

The bobbin unit for a brushless alternator field coil according to yet another embodiment is arranged such that the butt connection means is butt welding. As a result, connection is securely made.

The bobbin unit for a brushless alternator field coil according to still another embodiment is arranged such that the butt connection means is projection welding. As a result, welding can be executed by connecting electrodes to the proper positions of the iron core and the plate, a welding device need not be arranged as a device having a large scale and workability has an increased degree of freedom.

The bobbin unit for a brushless alternator field coil according to a further embodiment is arranged such that the butt connection means is beam welding. As a result, no projection need not be formed to the end surface of the plate and a welding portion can be suitably adjusted in the peripheral direction and accordingly the degree of freedom of a welding amount can be increased.

The bobbin unit for a brushless alternator field coil according to yet another embodiment is arranged such that the butt connection means is an adhesive. As a result, connection can be easily carried out without the need of, for example, a welding device.

The method of assembling a bobbin unit for a brushless alternator field coil according to an embodiment comprises the steps of mounting a thread-spool-shaped bobbin to a plate composed of a cylindrical portion having a thin wall and a flange portion extending outwardly in a radial direction from the end of the cylindrical portion one side thereof from the direction opposite to the flange portion, the bobbin being as long as the cylindrical portion; and abutting the end of the plate opposite to the flange portion against the end surface of a thick ring-shaped iron core and connecting the plate to the iron core by butt connection means. As a result, a job for mounting the bobbin to the plate can be easily carried out because positioning is not executed. Further, since the field coin is wound around the bobbin in advance, a job can be easily carried out.

The method of assembling a bobbin unit for a brushless alternator field coil according to still another embodiment is arranged such that the butt connection means is butt welding. As a result, connection is securely executed and workability is improved.

The method of assembling a bobbin unit for a brushless alternator field coil according to still another embodiment is arranged such that the butt connection means is an adhesive. As a result, a job can be easily carried out.

What is claimed is:

1. A bobbin unit for a brushless alternator field coil, comprising:
    a ring-shaped iron core having a thick wall defining a center hole, said thick wall delimited in an axial direction of said center hole by a first surface at one end and a second surface at another end opposite said first surface;
    a plate which has a cylindrical portion and a flange portion, said cylindrical portion defining a hole whose inside diameter is at least as large as an inside diameter of the center hole of said iron core, and wherein said cylindrical portion is connected to said iron core by abutting a distal end of said cylindrical portion opposite said flange portion to said first surface of said iron core and fixedly securing said distal end to said first surface by butt connection means provided at said distal end of said cylindrical portion where said cylindrical portion abuts said first surface so that an axial center of said cylindrical portion is substantially coincident with an axial center of said iron core, and so that said flange portion extends outwardly in a radial direction; and
    a resinous bobbin for insulating and accommodating a field coil disposed in a space formed by the first surface of said iron core and an outer peripheral surface of said plate.

2. The bobbin unit for a brushless alternator field coil according to claim 1, wherein said iron core has a circular engaging portion concentric with said center hole, and formed on the first surface of said iron core, and wherein said distal end of said cylindrical portion is fixedly secured to said circular engaging portion.

3. The bobbin unit for a brushless alternator field coil according to claim 1, wherein the butt connection means is butt welding.

4. The bobbin unit for a brushless alternator field coil according to claim 3, wherein the butt butt welding is projection welding.

5. The bobbin unit for a brushless alternator field coil according to claim 3, wherein the butt welding is beam welding.

6. The bobbin unit for a brushless alternator field coil according to claim 1, wherein the butt connection means is an adhesive.

7. A method of assembling a bobbin unit for a brushless alternator field coil, comprising the steps of:
    providing:
        a ring-shaped iron core having a thick wall defining a center hole, said thick wall delimited in an axial direction of said center hole by a first surface at one end and a second surface at another end opposite said first surface;
        a plate which has a cylindrical portion and a flange portion, said cylindrical portion defining a hole whose inside diameter is at least as large as an inside diameter of the center hole of said iron core, said flange portion extending outwardly in a radial direction from an end of said cylindrical portion; and a resinous bobbin for insulating and accommodating a field coil;

mounting said bobbin to said plate; and connecting said cylindrical portion of said plate to said iron core by abutting a distal end of said cylindrical portion opposite said flange portion to said first surface of said iron core and fixedly securing said distal end to said first surface by butt connection means provided at said distal end of said cylindrical portion where said cylindrical portion abuts said first surface so that an axial center of said cylindrical portion is coincident with an axial center of said iron core.

8. The method of assembling a bobbin unit for a brushless alternator field coil according to claim 7, wherein said butt connection means is butt welding.

9. The method of assembling a bobbin unit for a brushless alternator field coil according to claim 7, wherein said butt connection means is an adhesive.

* * * * *